US011210932B2

(12) United States Patent
Norris et al.

(10) Patent No.: US 11,210,932 B2
(45) Date of Patent: Dec. 28, 2021

(54) DISCOVERY OF AND CONNECTION TO REMOTE DEVICES

(71) Applicant: Apple Inc., Cupertino, CA (US)

(72) Inventors: Jeffrey S. Norris, Saratoga, CA (US); Bruno M. Sommer, Sunnyvale, CA (US); Alexandre Da Veiga, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 16/878,249

(22) Filed: May 19, 2020

(65) Prior Publication Data

US 2020/0372789 A1 Nov. 26, 2020

Related U.S. Application Data

(60) Provisional application No. 62/850,596, filed on May 21, 2019.

(51) Int. Cl.
*H04W 76/10* (2018.01)
*G08C 17/02* (2006.01)
(Continued)

(52) U.S. Cl.
CPC ........... *G08C 17/02* (2013.01); *G06K 9/2054* (2013.01); *G06K 9/6201* (2013.01); *H04W 8/005* (2013.01);
(Continued)

(58) Field of Classification Search
CPC ....... G06F 3/017; H04W 76/10; H04W 4/023; H04W 12/06; H04W 8/005
See application file for complete search history.

(56) References Cited

U.S. PATENT DOCUMENTS 9,380,621 B2    6/2016   Jamal-Syed et al.
2014/0096220 A1 4/2014   Da Cruz Pinto et al.
(Continued)

FOREIGN PATENT DOCUMENTS

CN          105955043 A     9/2016

OTHER PUBLICATIONS

Melnick, Kyle, "Navigate Your Smart Home Devices in AR", VR Scout, Jul. 1, 2018, https://vrscout.com/news/smart-home-devices-in-ar/ (10 pp).

(Continued)

*Primary Examiner* — Benyam Haile
(74) *Attorney, Agent, or Firm* — Young Basile Hanlon & MacFarlane, P.C.

(57) ABSTRACT

A method includes identifying remote devices, at a host device, based on received signals that indicate locations and device types for the remote devices. The method also includes identifying visible devices in images of a location and matching a first visible device to a first remote device. The first visible device is matched with the first remote device based on presence of the first visible device within a search area of the images, the search area of the images is determined based on the location for the first remote device, the first visible device is matched with the first remote device based on the device type for the first remote device, and the first visible device is matched with the first remote device based on a machine recognizable indicator that is output by the first visible device. The method also includes pairing the first remote device with the host device.

21 Claims, 6 Drawing Sheets

(51) Int. Cl.
   *G06K 9/20*    (2006.01)
   *H04W 8/00*    (2009.01)
   *G06K 9/62*    (2006.01)
(52) U.S. Cl.
   CPC ........ *H04W 76/10* (2018.02); *G08C 2201/31* (2013.01)

(56) References Cited

U.S. PATENT DOCUMENTS

| | | |
|---|---|---|
| 2014/0225924 A1 | 8/2014 | Loxam et al. |
| 2015/0120000 A1 | 4/2015 | Coffey et al. |
| 2016/0165170 A1 | 6/2016 | McRae |
| 2016/0217617 A1 | 7/2016 | Barribeau |
| 2017/0061692 A1 | 3/2017 | Giraldi et al. |
| 2017/0228935 A1* | 8/2017 | Foster .................... G06T 19/00 |
| 2017/0244811 A1 | 8/2017 | Mckenzie et al. |
| 2018/0197009 A1 | 7/2018 | Severn et al. |
| 2018/0314416 A1* | 11/2018 | Powderly ............. G02B 27/017 |

OTHER PUBLICATIONS

Hayo, "Hayo Transforms The Objects and Spaces Around You Into a Set of Magical Remote Controls", https://hayoo.io/, Downloaded Jan. 15, 2019 (8 pp).

Sorgalla, Jonas et al., "ARGI: Augmented Reality for Gesture-Based Interaction In Variable Smart Environments", In Proceedings of the 13th Intl Joint Conference on Computer Vision, Imaging and Computer Graphics Theory and Applications, 2018 vol. 2: HUCAPP, pp. 102-107 (6 pp).

* cited by examiner

DISCOVERY OF AND CONNECTION TO REMOTE DEVICES

CROSS-REFERENCE TO RELATED APPLICATIONS

This application claims the benefit of U.S. Provisional Application No. 62/850,596, filed on May 21, 2019, the content of which is hereby incorporated herein in its entirety for all purposes.

TECHNICAL FIELD

The application relates generally to data connections between computing devices.

BACKGROUND

Some electronic devices can connect to other nearby devices to allow the devices to send and receive information to each other. The process of establishing communication between nearby devices may be referred to as pairing. As one example, audio or video content can be sent from a host device for playback at a nearby device subsequent to pairing. As another example, a data file such as a word processing document may be sent from a host device to a nearby device subsequent to pairing. One common method of pairing involves selecting a device from a list of nearby devices and optionally entering a password or code.

SUMMARY

One aspect of the disclosure is a method that includes identifying, by a host device, remote devices based on received signals, wherein the received signals indicate a location of each of the remote devices relative to the host device and a device type for each of the remote devices. The method also includes identifying visible devices in images of a location and matching a first visible device from the visible devices to a first remote device from the remote devices. The first visible device is matched with the first remote device based on presence of the first visible device within a search area of the images, the search area of the images is determined based on the location for the first remote device, the first visible device is matched with the first remote device based on the device type for the first remote device, and the first visible device is matched with the first remote device based on a machine recognizable indicator that is output by the first visible device. The method also includes pairing the first remote device with the host device.

In some implementations, pairing the first remote device with the host device is performed in response to a user input from a user. The user input may indicate an intention to pair the host device with the first remote device by including a device type indication that corresponds to the device type of the first remote device. The images of images of the location may be captured using an imaging device that is associated with the host device and the user input indicates an intention to pair the host device with the first remote device based on a view angle of the imaging device. The user input may include a verbal command that is spoken by the user.

In some implementations, matching the first visible device to the first remote device includes excluding a second remote device as a potential match to the first visible device based on a difference between a location of the first visible device and a location of the second remote device.

In some implementations, the machine recognizable indicator includes content that is output for display on a screen of the first remote device. The content may be predetermined content. The first remote device may transmit a screenshot showing the content to the host device. In some implementations, the machine recognizable indicator may include visible illumination. In some implementations, the machine recognizable indicator includes infrared illumination.

The method may also include controlling a function of the first remote device using the host device subsequent to pairing the first remote device with the host device.

Another aspect of the disclosure is a method that includes receiving, at a host device, a received signal that identifies a control device that has not previously connected to the host device, wherein the received signal indicates a location for the control device, the control device is connected to a controlled device, and the control device is configured to change an operating state of the controlled device. The method also includes identifying visible devices in images of a location, matching the control device to a first visible device from the visible devices in the images based on presence of the first visible device within a search area of the images and the search area of the images is determined based on the location for the control device, matching the controlled device to a second visible device from the visible devices in the images, and pairing the control device with the host device.

The first visible device may be matched with the control device further based on a device type for the control device. The first visible device may be matched with the control device further based on a machine recognizable indicator that is output by the control device.

The second visible device may be matched with the controlled device based on a user input that identifies the controlled device. The second visible device may be matched with the controlled device by changing the operating state of the controlled device using the control device and detecting the change of the operating state of the second visible device in the images.

In some implementations, the method also includes controlling the control device using the host device to change the operating state of the controlled device between a first operating state and a second operating state. In some implementations, the control device is a switch and the controlled device is a light.

Another aspect of the disclosure is a method that includes identifying a first control device and a controlled device in images of a location, wherein the first control device is configured to change an operating state of the controlled device. The method also includes identifying a second control device, configuring a relationship between the second control device and the controlled device, and providing pairing information for the second control device to a host device. The method also includes replacing the first control device with the second control device such that the second control device is configured to change the operating state of the controlled device and pairing the second control device with the host device using the pairing information.

The method may also include controlling the second control device using the host device to change the operating state of the controlled device between a first operating state and a second operating state. In some implementations, the first control device is a first switch, the second control device is a second switch, and the controlled device is a light.

Another aspect of the disclosure is a method that includes identifying, by a host device, a space within a building based on received signals from a locator component that is associated with the space within the building, matching a visible feature associated with the space within the building with the received signals from the locator component, and, in response to user selection of the visible feature, accessing a scheduling interface that is associated with the space within the building. The method may also include updating information included in the scheduling interface for the space within the building in response to a user input.

DETAILED DESCRIPTION

The systems and methods that are disclosed herein are directed to discovery and connection to remote devices. As examples, the connections between devices that are contemplated herein can allow a first device to transfer a data file (e.g., a document file or media file) to a second device, can allow the first device to stream media content (e.g., an audio recording or a video) to the second device, can allow the first device to access and retrieve information that is stored on the second device, or can allow the first device to exercise control over one or more functions of the second device. Other types of actions can be facilitated by the data connections that are described herein. Pairing two devices by selecting the second device from a list does not allow the user to understand how the listed device names correlate to real-world devices. The systems and methods that are described herein use wireless position sensing and machine vision techniques in combination to allow users to select the device that they wish to connect to.

Figure 1:
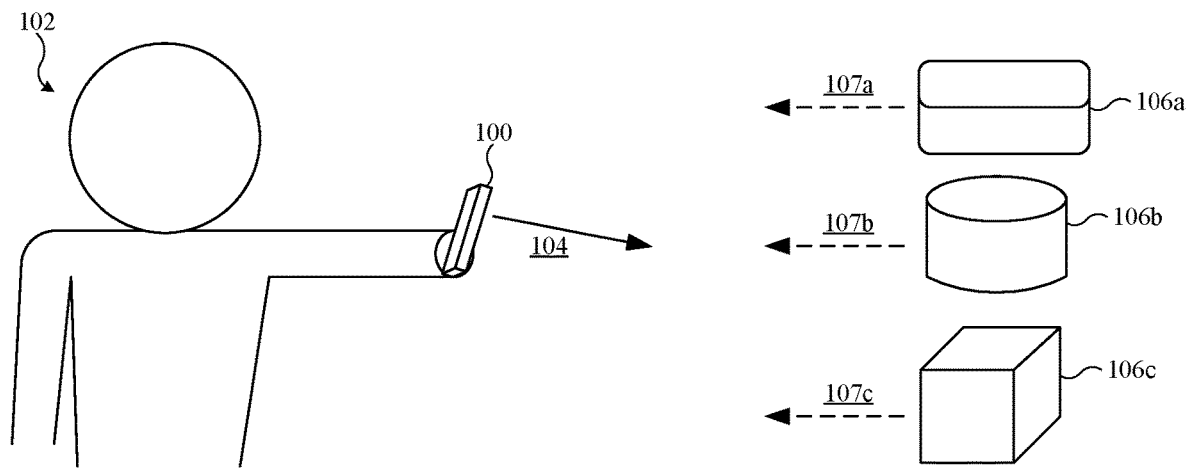
FIG. 1 is an illustration that shows a hand-held computer-generated reality device and remote devices.

FIG. 1 is an illustration that shows a handheld computer-generated reality (CGR) device 100. In this example, the handheld CGR device 100 is an electronic device that has a form factor that allows it to be held by a user 102. As examples of form factors, the handheld CGR device 100 may be implemented in the form of a smart phone or a tablet computer. The user 102 is holding the handheld CGR device 100 such that a view direction 104 is oriented toward remote devices, which in the illustrated example include a first remote device 106a, a second remote device 106b, and a third remote device 106c. The first remote device 106a, the second remote device 106b, and the third remote device 106c are configured to transmit signals 107a, 107b, 107c to the handheld CGR device 100 as part of a location detection system, as will be described herein.

Figure 2:
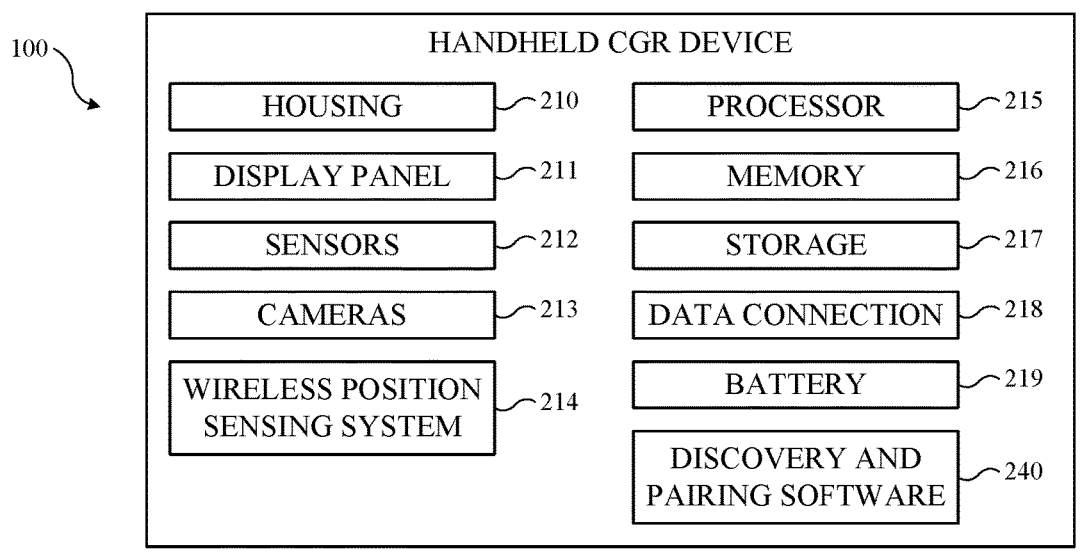
FIG. 2 is a block diagram that shows the hand-held computer-generated reality device of FIG. 1.

FIG. 2 is a block diagram that shows an example of the hardware components that may be included in the handheld CGR device 100. The handheld CGR device 100 may include a housing 210, a display panel 211, sensors 212, cameras 213, a wireless position sensing system 214, a processor 215, a memory 216, storage 217, a data connection 218, and a battery 219. As examples, the handheld CGR device 100 may be implemented in the form of a smartphone, a smart watch, or a tablet computer.

As will be explained in detail herein, the handheld CGR device 100 includes discovery and pairing software 240, which allows the handheld CGR device 100 to establish communications with remote devices, such as the first through third remote devices 106a-106c. For example, the discovery and pairing software 240 may be stored in the storage 217 and loaded into the memory 216 as needed, so that it can be executed by the processor 215 to control aspects of the operation of the handheld CGR device 100.

The housing 210 is the physical structure that other components of the handheld CGR device 100 are connected to and supported by. Various configurations and materials can be used for the housing 210. The display panel 211 is a device that is operable to output images, such as still images or video images. As examples, the display panel 211 may be an LCD display panel, an LED display panel, or an OLED display panel.

The sensors 212 are devices that are incorporated in the handheld CGR device 100, such as by being located inside the housing 210 or by being permanently connected to the housing 210. The sensors 212 are able to output signals that represent a sensed condition. Examples of individual sensors that can be incorporated in the sensors 212 include an inertial measuring unit that utilizes accelerometers, gyroscopes, and magnetometers to output information that describes motion, visible spectrum cameras, infrared spectrum cameras, structured-light stereo devices, depth cameras, lidar devices, radar devices, ultrasonic devices, infrared detectors that measure signals from external infrared sources, infrared beacons that emit signals that can be measured by external infrared detectors, biometric sensors, capacitance sensors, temperature sensors, light sensors, and force sensors.

The cameras 213 include one or more visible spectrum cameras and/or infrared cameras that are operable to capture images (e.g., video frames that each include an array of pixels) of the environment around the handheld CGR device 100. The handheld CGR device 100 may be, as an example, a video pass-through augmented reality device, that utilizes the images that are obtained by the cameras to generate the content that is displayed to the user of the handheld CGR device 100 using the display panel 211. For example, the cameras 213 may obtain images, add elements to the images to define augmented images, and output the augmented images using the display panel 211 of the handheld CGR device 100.

The wireless position sensing system 214 is a sensor system that is configured to transmit signals to and receive signals from compatible sensing devices. The signals that are transmitted and received by the wireless position sensing system may be radio frequency signals. The signals that are transmitted and receive by the wireless position sensing system 214 are usable for determining the range and angle of the transmitting device relative to the receiving device, and also include information that identifies the transmitting device, such as an alphanumeric identifier.

The wireless position sensing system 214 may include, for example, transmitter elements and receiver elements. The transmitter elements may be used to transmit signals from the handheld CGR device 100 that can be used by compatible devices for range and angle of arrival determinations. The receiver elements can be used to receive signals from compatible sensing devices, and these signals may be transmitted by the compatible sensing devices in the same manner that signals are transmitted by the transmitter elements of the wireless position sensing system 214 of the handheld CGR device 100. Wireless ranging and angle of arrival estimation can be performed using conventional techniques and other techniques that are now known or later developed. As an example, wireless ranging techniques that estimate the distance between devices can be based on time of arrival, based on the time difference between a known time of transmission of a signal and a measured time of arrival of the signal. To estimate angle of arrival, the receiver elements may be an antenna array that includes multiple antennas. By determining differences in time, phase, and frequency of the received signal as measured by the multiple antennas that are included in the receiver elements, the angle of arrival of the signal can be estimated.

The processor 215 is incorporated in the handheld CGR device 100, such as by location in the housing 210. The processor 215 is operable to execute computer program instructions and perform operations described by the computer program instructions. As an example, the processor 215 may be a conventional device such as a central processing unit. The memory 216 may be a volatile, high-speed, short-term information storage device such as a random-access memory module. The storage 217 may be a non-volatile information storage device such as a flash memory module, a hard drive, or a solid-state drive. The processor 215, the memory 216, and the storage 217 are electrically connected (e.g., by a system bus) to allow for high-speed transfer of data between them.

The data connection 218 is communications connection that allows information to be exchanged between the handheld CGR device 100 and other computing devices such as the first through third remote devices 106a-106c. The data connection 218 may also be used by the handheld CGR device 100 to obtain any internet-accessible information when connected to a suitable source of connectivity with the internet. The data connection 218 may be a wired connection or a wireless connection using any suitable communications protocol. As one As an example, the data connection 218 may be implemented as a wireless local area network (WLAN). In one implementation, a WLAN may be implemented using a wireless data communication standard from the Institute of Electrical and Electronics Engineers (IEEE) 802.11 family of standards (i.e., Wi-Fi), such as the 802.11ac standard, the 802.11ad standard, or the 802.11ax standard. As another example, the data connection 218 may be implemented as a wireless personal area network (WPAN). In one implementation, a WPAN may be implemented using the Bluetooth® wireless data communication standards published by the Bluetooth® Special Interest Group.

The battery 219 is incorporated in the handheld CGR device 100 to allow operation of the handheld CGR device 100 without a wired power-transmitting connection to a power supply.

The systems as methods that are described herein may also be implemented using a head-mounted CGR device (e.g., a head-mounted display) in place of the handheld CGR device 100. The head-mounted CGR device is an electronic device that has a form factor that allows it to be worn on the head of the user 102. The head-mounted CGR device may utilize known configurations and may be implemented in the form of, as examples, a video pass-through augmented reality device or an optical pass-through augmented reality device. The user 102 controls the orientation of the view direction 104 of the head-mounted CGR device by the position and angular orientation of their head, and optionally based on the gaze angle of their eyes, in implementations in which the head-mounted CGR device has eye-tracking capabilities. In the illustrated example, the head-mounted CGR device is oriented such that the view direction 104 is oriented toward remote devices, which in the illustrated example include the first remote device 106a, the second remote device 106b, and the third remote device 106c. The first remote device 106a, the second remote device 106b, and the third remote device 106c transmit the signals 107a, 107b, 107c to the head-mounted CGR device for location detection, as will be described herein.

The head-mounted CGR device may include components similar to those described in connection with the handheld CGR device 100, such as a housing, a headband, a display panel, optics, sensors, cameras, a wireless position sensing system, a processor, a memory, storage, a data connection, and a battery. As examples, the head-mounted CGR device may be configured as an optical pass-through augmented reality system or a video pass-through augmented reality system. The head-mounted CGR device may include the discovery and pairing software 240.

The head-mounted CGR device differs from the handheld CGR device in that it is intended to be worn on the user's head and positioned near the user's eyes. Thus, for example, the housing is connected to the headband, which supports the housing with respect to the user's head. Common configurations that can be utilized for the headband include, as examples, a "goggles" type configuration, a "halo" type configuration, or a "mohawk" type configuration.

The display panel of the head-mounted CGR device is associated with optics that are configured to direct light that is emitted from the display panel to the user's eyes and may also allow light from the external environment to reach the user's eyes. The optics may include, as examples, lenses, reflectors, polarizers, waveguides, and/or other components. In one implementation, the optics may include a lens that is positioned between the display panel and the user's eyes. In another implementation the optics may be configured as an optical combiner, such as an off-axis combiner, a polarized beam combiner, or a waveguide combiner.

Figure 3:
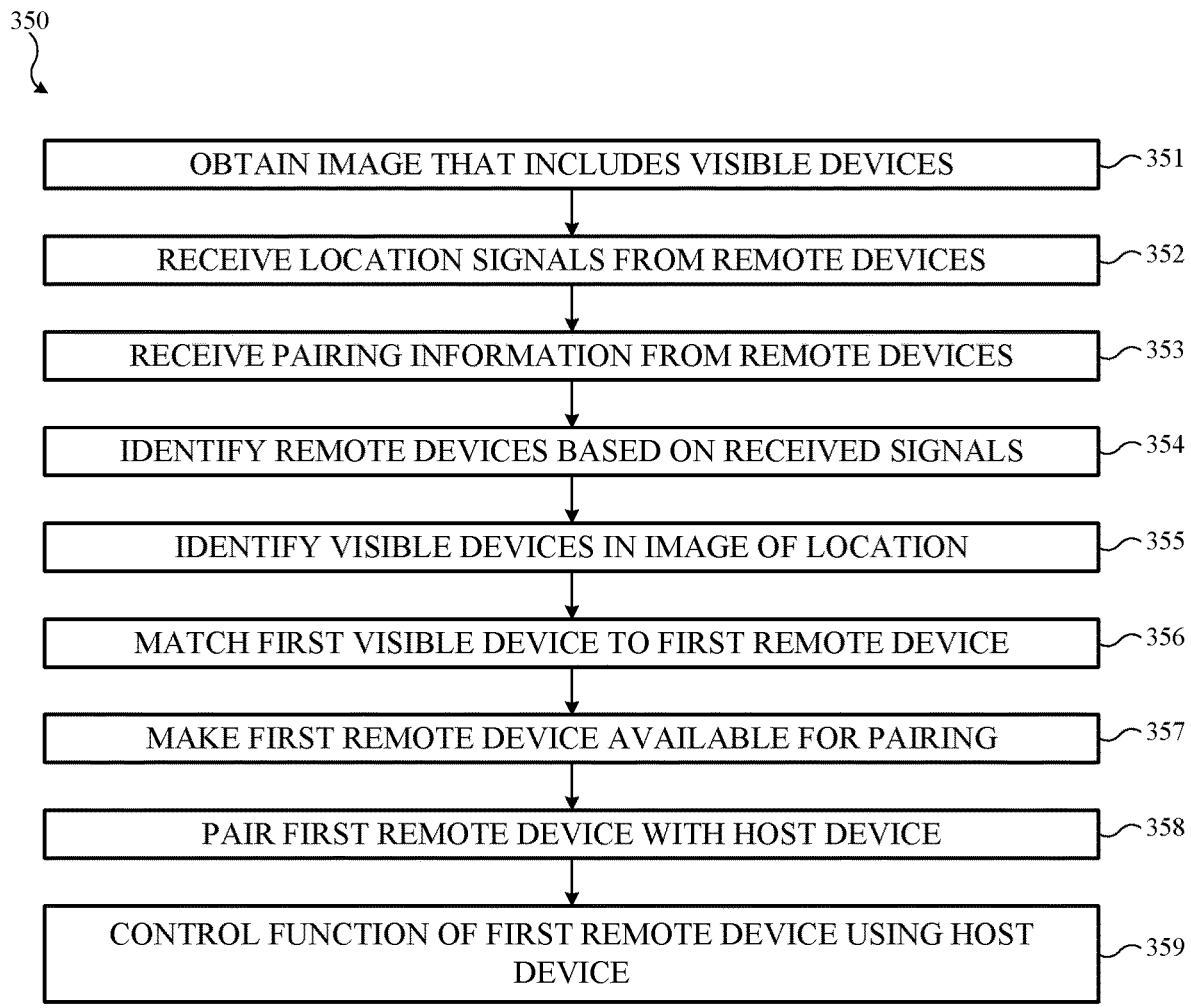
FIG. 3 is a flowchart that shows a process for device discovery and pairing according to a first example.

FIG. 3 is a flowchart that shows a process 350 for device discovery and pairing according to a first example. The process 350 may be performed, for example, using the handheld CGR device 100 or the head-mounted CGR device. Portions of the process 350 can be implemented as computer program instructions, such as the discovery and pairing software 240. The computer program instructions can be executed by a computing device, such as the processor 215 of the handheld CGR device 100. When executed, the instructions cause the computing device to perform the operations described herein. In some implementations, the process 350 is implemented in the form of computer executable program instructions on a non-transitory computer-readable storage device.

The process 350 allows a host device to connect to remote devices in a process that requires minimal user input and ensures that the device with which communication is established is the device that the user intended to connect to. In the process 350, location signals and images are utilized to locate and identify remote devices, and to determine a correlation between these devices and pairing information that allows the host device to establish a connection with the remote devices. Examples of host devices include the handheld CGR device 100 and the head-mounted CGR device.

Examples of remote devices include the first remote device 106a, the second remote device 106b, and the third remote device 106c.

During execution of the process 350, the host device receives inputs that are used as a basis for discovering remote devices and connecting to them by pairing the host device with the remote device. This allows the host device to control one or more functions of the remote device. The inputs received by the host device may include images, location signals, and pairing signals that include pairing information. In the implementation described herein, these inputs are received by the host device in operations 351-553. In particular, operation 351 includes obtaining an image that includes visible devices, operation 352 includes receiving location signals from remote devices, and operation 353 includes receiving pairing signals that include pairing information from the remote devices. Operations 351, 352, and 353 may occur in any order and need not be performed in series. For example, the inputs received in operations 351-553 can be updated by parallel processes at differing rates.

In operation 351, the image that includes visible devices is obtained from a host device along a view direction. The term "visible devices" means that devices, which may be the same devices as those included among the remote devices, can be seen in the image. This allows the image to be used as a basis for identifying the locations of these devices and matching them to remote devices in subsequent operations. Once matched, the visible devices can still be tracked by the host device, for example, to allow the host device to show the user that the devices are present (e.g., by augmenting the images with annotations) or to allow the host device to interpret user intention based on gaze direction.

The image may be obtained by capturing the image using a camera that is associated with the host device. Alternatively, the image could be captured by a camera external to the host device and obtained by the host device in by a transmission from the external camera. The view direction may correspond to an optical axis of the camera and can be expressed and stored in a form that can be interpreted during analysis of the image.

The image that is obtained in operation 351 may be a digital image that is defined by an array of pixels that each have pixels values (e.g., represented as RGB values or according to another color representation scheme). The images may be obtained by a still image camera or by a video camera. The images may be visible spectrum images, or may be other than visible spectrum images, such as infrared spectrum images. As one example the image may be captured in operation 351 by the cameras 213 of the handheld CGR device 100.

In operation 352 location signals are received from remote devices. The location signals are detected by the host device, for example, using the wireless position sensing system 214 of the handheld CGR device 100.

The location signals that are received by the host device in operation 352 can allow the host device to determine a relative position of each of the remote devices relative to the host device. For example, the location signals can allow the host to determine a bearing and a distance for each of the remote devices relative to the host device. As explained with respect to the wireless position sensing system 214 of the handheld CGR device 100, wireless ranging and angle of arrival estimation techniques can be used to determine the relative position of each of the remote devices with respect to the host device.

Each of the location signals also includes information that allows the host to identify the remote device that transmitted the signal. As an example, the signal received from each of the remote devices can include an alphanumeric identifier that identifies the device that transmitted the signal. This identifier may be referred to as a location signal device identifier.

In operation 353 pairing information is received from the remote devices. The pairing information is received from the remote devices using a wireless communications channel in the form of a pairing signal. As an example, the pairing signal may be a wireless broadcast message that is transmitted from each of the remote devices to all devices within range to indicate availability of each remote device for communications using that wireless communication channel.

The wireless communication channel that is used for transmission and receipt of the pairing information in operation 353 may be the same communications channel by which communications may later be established with the remote devices for transmission of signals and data from the host device to the remote devices. As an example, the pairing information may be received by the handheld CGR device 100 using the data connection 218. The wireless communication channel that is used for transmission and receipt of the pairing information in operation 353 is separate and distinct from the wireless communication channels that are used for transmission and receipt of the location signals.

Each of the pairing signals identifies the remote device that it is associated with. As an example, the signal received from each of the remote devices can include an alphanumeric identifier that identifies the device that transmitted the signal. This identifier may be referred to as a pairing signal device identifier.

Operation 354 includes identifying the remote devices based on the received signals. Operation 354 is performed by the host device using signals received by host device, including the location signals that are received by the host device as described with respect to operation 352, and using the pairing signals and pairing information received by the host device as described with respect to operation 353. Thus, the received signals may include information that indicates, by processing and interpretation by the host device, a location (e.g., distance and bearing) of each of the remote devices relative to the host device and a device type for each of the remote devices.

The location signals and the pairing signals can be correlated to each other by matching the device identifiers or other identifying information that they contain. The received signals may be correlated, for example, based on the location signal device identifiers and the pairing signal device identifiers, such that a list of remote devices can be defined that includes both location information and pairing information for each of the remote devices. This allows the location of a device, as determined using the location signals, to be used as a basis for pairing the host device to a particular one of the remote devices.

Operation 355 includes identifying visible devices in the images of the location that were obtained in operation 351. The image that was obtained in operation 351 can be analyzed to determine the presence of devices that are visible in the image. At this point in the process 350, however, the visible devices have not yet been matched to one of the remote devices using the location information and the pairing information.

The presence of visible devices in the image can be determined using conventional object detection techniques, as are well known in the machine vision field. The visible devices can be identified in the image by detecting presence of potentially matching devices generally, using an object detection model that is configured to detect the presence of any of a large number of different devices having different visual appearances.

In some implementations, the object detection task can utilize information that identifies the types of the remote devices to enhance detection of visible devices in images. For example, the location information or the pairing information can be used to determine particular types (classification, manufacturer, and/or model) of devices that may be present in the image. This information is used both to help detect the presence of the devices in the image and to match visible devices with the nearby remote devices. As one example, object detection based on device type can use known images of the same type of device for comparison purposes. As another example, object detection based on device type can use a model that is trained to recognize the corresponding type of device (e.g., a model that was trained using images of the same type of device).

Operation 356 includes matching a first visible device to a first remote device. The first visible device is one of the visible devices that was identified in operation 355. The first remote device is one of the remote devices that was identified in operation 354. As will be explained herein, the first visible device is may be matched with the first device based on presence in the image, based on device type, and based on detection of a machine recognizable indicator. Matching may also be based on other types of signals and data. Matching the first visible device to the first remote device in operation 356 may include determining a likelihood that a specific one of the visible devices that were identified in operation 355 corresponds to (i.e., is the same device) as a specific one of the remote devices that were identified in operation 354.

Operation 356 may include filtering the remote devices based on location to eliminate some of the remote devices as potential matches to visible devices. For example, the location signals may be used to create a list of the remote devices that are located near the host device. Initially, all devices from which location signals where received can be identified. This initial list can then be filtered to create the list of the remote devices that are located near the host device. As one example, devices can be excluded on the basis of range. Devices corresponding to location signals having a range that exceeds a threshold value (e.g., indicating that the remote device is not located in the same room as the host device) are excluded because they are not located near the host device.

Figure 4:
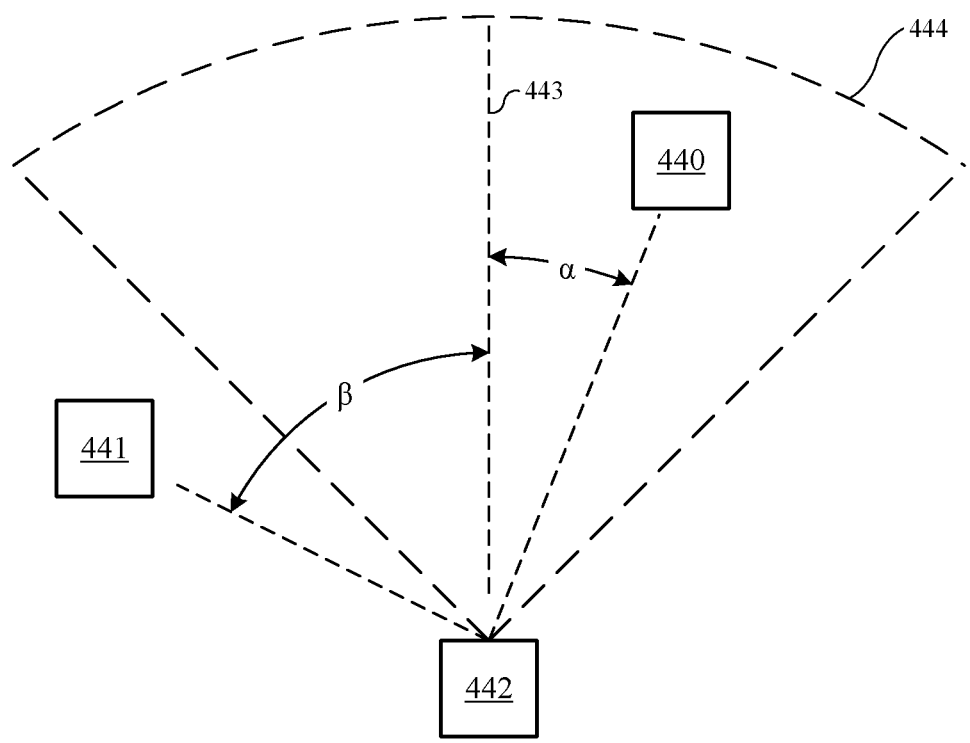
FIG. 4 is a top-down illustration showing remote devices and a host device.

As another example, devices can be excluded on the basis of angle of arrival. As shown in FIG. 4, which is a top-down illustration showing first and second remote devices 440-641 and a host device 442, the location signals can be used to determine which devices have an angle of arrival that does not correspond to a field of view 443 of an imaging device that is included in the host device 442 (e.g., the imaging device that obtained the image in operation 351). The first remote device 440 is within the field of view 443 of the imaging device, which can be determined by comparison of an angle of arrival α to an optical axis 444 of the imaging device (e.g., the angle of arrival α deviates from the optical axis by less than a threshold value). The second remote device 441 is not within the field of view 443 of the imaging device, which can be determined by comparison of an angle of arrival β to the optical axis 444 of the imaging device (e.g., the angle of arrival β deviates from the optical axis by more than a threshold value).

Thus, in some implementations, matching a visible device to a remote device may include includes excluding one or more other remote devices as potential matches to the first visible device based on a difference between a location of the visible device and the location of the one or more other remote devices.

Figure 5:
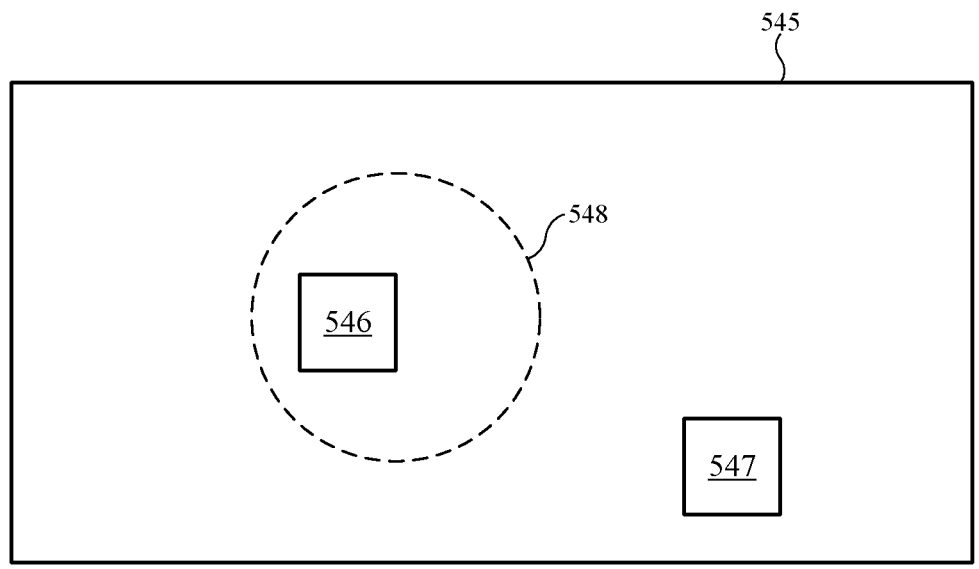
FIG. 5 is an illustration that shows an image that depicts first and second visible devices and a search area.

After initial filtering has been performed based on the location signals, matching may commence with respect to the remaining remote devices that were not excluded from the potentially matching devices. As shown in FIG. 5, which is an illustration showing an image 545 that depicts first and second visible devices 546-747 and a search area 548, an expected location of a respective one of the remote devices may be defined in a location-based matching operation using the orientation of the image that was obtained in operation 351 and the angle of arrival to project the location of the respective remote device into image space. Because there is some degree of error (e.g., plus or minus ten degrees) associated with each of the angle of arrival estimate, the expected location of each of the remote device can be represented as an area of the image, which is the search area 548 of the image 545 in the illustrated example. The first visible device 546 may be a match to a first remote device (for which the search area 548 was defined) because it appears inside the search area 548. It is determined that the second visible device 547 is not a match because it is not located inside the search area 548.

Thus, in the location-based matching operation, a first visible device may be matched with a first remote device based on presence of the first visible device within a search area of an image. The search area is a portion of the image where the first remote device should be visible and is determined based on the location for the first remote device.

Each visible device from the search area of the image is compared to the nearby remote devices. The location of each visible device in the image is be compared to the known locations (based on the location signals) of the nearby remote devices. Potential matches are excluded when the image position and the location signal position differ by more than a threshold value.

Potential matches can be evaluated based on the device types identified for the visible devices in operation 355. For example, potential matches can then be excluded if the device type identified for the visible device does not match the device type as determined based on the location signal or the pairing signal.

If, after location-based matching and device-type based matching, two or more of the visible devices remain as potential matches that may correspond to a single one of the remote devices, additional techniques can be used to resolve this ambiguity. In one implementation, a visible device can be matched to one of the known devices using a machine recognizable indicator that is output by the visible device. The machine recognizable indicator is an output, such as an audible output or a visible output, of the visible device. The host device can recognize the presence of the machine recognizable indicator, for example, using the images that were obtained by the host device or by obtaining audio using a microphone.

As one example, the machine recognizable indicator includes content that is output for display on a screen of a selected remote device. The host device may send a request to the selected remote device that causes the display the content. The content may be predetermined content that is output for display on the screen of the selected remote device. The content may be arbitrary content, such as content currently display when the host device sends a request to the selected remote device, and the selected remote device may transmit a screenshot to the host device, where the screenshot shows the content and can be used by the host device as a basis for identifying the selected remote device by identifying the same content in the image obtained by the host device.

As another example the machine recognizable indicator may include a sound that is output by the selected remote device. The sound can be output, for example, in response to a request from the host device. The host device may use a directional microphone (e.g., a microphone array) to determine a source direction for the sound, and this can be used as an additional signal for matching the selected host device to the visible devices.

As another example, the machine recognizable indicator may be a visible illumination pattern, for example, having a certain color pattern and/or flash pattern, that is output by the selected remote device. As another example, the machine recognizable indicator may be an infrared beacon. For example, the selected remote device can illuminate an infrared light source constantly or in a flash pattern.

In operation 357, one or more of the remote devices is made available for pairing. The device may be made available for pairing by associating the pairing information for the remote device with the area of the image at which the device is depicted. Availability of the remote device may be indicated in the image by an icon, an outline, other graphical indicator.

In some implementations, one or more of the remote devices is only made available for pairing if a certainty value meets a certainty threshold. The certainty threshold may be a pre-selected value. The certainty value may be a numerical score that represents the likelihood that the visible device from the image is the same device as one identified by the location signals and the pairing signals. A numerical representation could be calculated using factors such as a difference between an expected location of the remote device based on the location signal and an observed location of the remote device from the image, a degree of confidence in device-type based matching, and/or the presence of other remote devices that cannot be excluded as potential matches.

In operation 358, the host device is paired with the remote device. As one example, the host device may be paired with the remote device in response to a command from a user. As another example, the hose device may be paired with the remote device in response to a command issued by a software process that is being executed by the host device. As another example, the host device can be paired with the remote device automatically in response to making the remote device available for pairing in operation 355.

In some implementations, the remote device that is paired with the host device in operation 356 may be selected based in part on the view angle of the host device. In some implementations, the user could be asked by the host device (e.g., in a dialog box or by an audio prompt) whether they wish to connect to the remote device when the view angle of the host device corresponds to a location near the remote device. In some implementations, the user may issue a pairing command (e.g., verbally or using a button or touch-sensing interface) while the view angle of the host device corresponds to a location near the remote device.

In some implementations, the remote device that is paired with the host device in operation 356 may be selected based in part on information included in a command issued by the user. For example, a pairing command also include an information that indicates which device is intended for pairing when multiple devices are located near the view angle of the host device. This information could be spoken by the user in the context of a natural-language command and interpreted by the host device. As an example, the view angle of the host device could be directed to a location near a smart phone and a tablet computer. Using image analysis, each of these remote devices is assigned a device type. Thus, a pairing command such as "connect to my phone" will cause paring with the device that is near the location indicated by the view angle of the host device and that matches the device type indicated by the pairing command. Thus, pairing the remote device with the host device may be performed in response to a user input from a user. The user input may indicate an intention to pair the host device with the first remote device based on a view angle of the imaging device, and the user input may include a verbal command that is spoken by the user.

Pairing the host device with the remote device establishes a communications connection between the devices that allows for transfer of information between the devices, such as by issuing commands from the host device that are executed by the remote device or by transmitting files from the host device to the remote device or from the remote device to the host device. In operation 359, at least one function of the remote device is controlled by the host device, such as by transmission of a command from the host device to the remote device, wherein the command, when interpreted by the remote device, causes the remote device to perform a function. In some implementations, pairing the remote device with the host device may allow the host device to display an interface for the remote device in an augmented reality view. For example, virtual buttons and/or information displays could be displayed next to a device that has no buttons and/or information displays, to allow it to be controlled by the host device, or additional buttons could be displayed next to a device that has few buttons and/or information displays (e.g., for a small device such as a smart watch).

Subsequent to pairing, some of the signals used for paring may also be used to accurately track the position and orientation of the remote device relative to the host device. As one example, identification of the remote device in the image can be used in conjunction with a known geometric configuration of the remote device to track the position and pose of the remote device in the image. As another example, the host device can use knowledge of the content displayed on the screen of the remote device (e.g., a screenshot of content from the remote device that is transmitted to the host device) to track the position and pose of the remote device in the image. For example, the screenshot (or other representation of content) can be compared to the observed content in the image captured by the host device and by determining a three-dimensional transform required to match the two, the position and pose of the remote device can be determined. As another example, the host device can transmit, to the host device content to be displayed by the host device for use in tracking the position and pose of the remote device in the image obtained by the host device based on the relative three-dimensional transform required to match the images.

Figure 6:
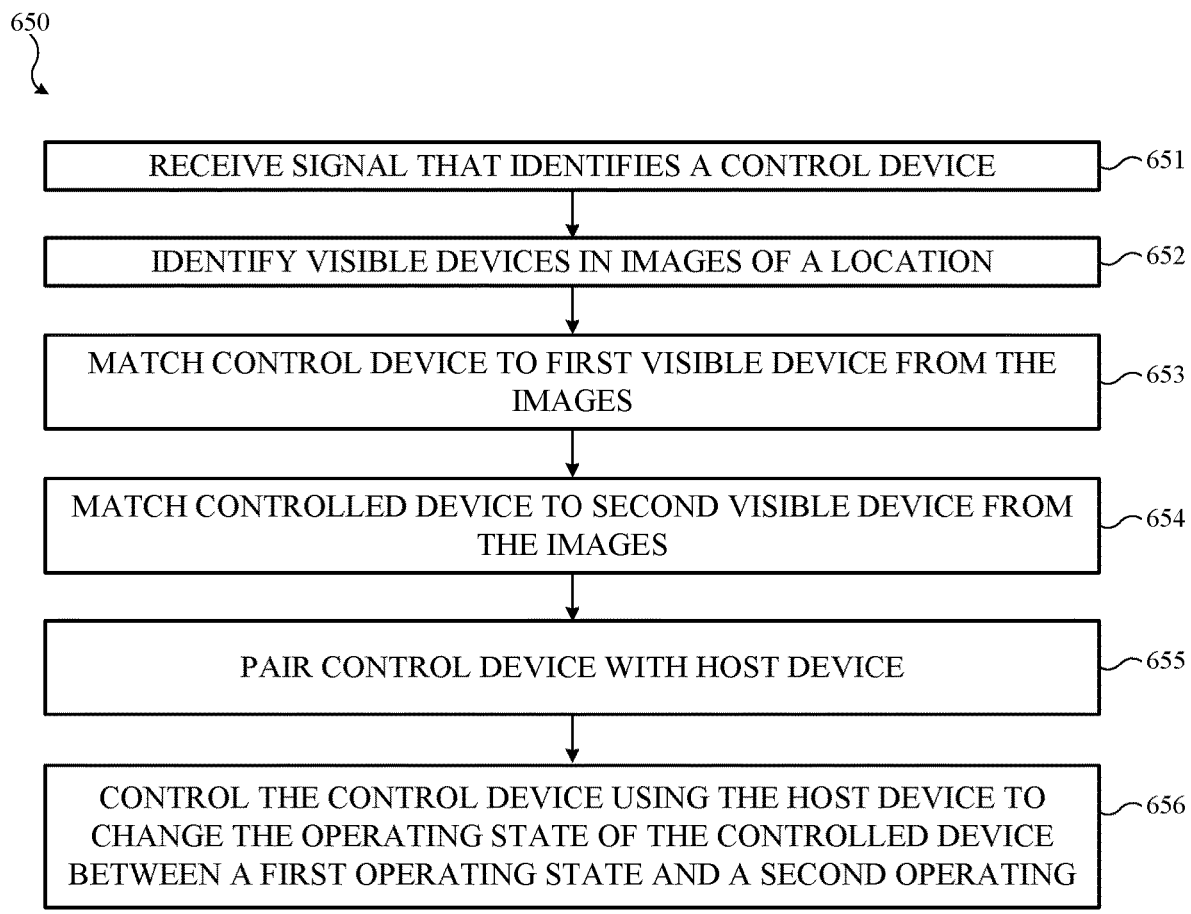
FIG. 6 is a flowchart that shows a process for device discovery and pairing according to a second example.

FIG. 6 is a flowchart that shows a process 650 for device discovery and pairing according to a second example. The process 650 may be performed, for example, using the handheld CGR device 100 or the head-mounted CGR device. Portions of the process 650 can be implemented as computer program instructions, such as the discovery and pairing software 240. The computer program instructions can be executed by a computing device, such as the processor 215 of the handheld CGR device 100. When executed, the instructions cause the computing device to perform the operations described herein. In some implementations, the process 650 is implemented in the form of computer executable program instructions on a non-transitory computer-readable storage device.

The process 650 allows a host device to connect to a control device that is connected to a controlled device and defines an association between the control device and the controlled device, such that the host device can operate the controlled device by sending commands to the control device in response to user commands that select to controlled device as a target. An example of a control device is a smart light switch and an example of a controlled device is a light (e.g., a wall or ceiling mounted light is a building), which may be connected to the control device by electrical wiring, or otherwise connected such that the control device is connected to the controlled device to change its operating state between a first operating state (e.g., the light is off) and a second operating state (e.g., the light is on). Examples of host devices include the handheld CGR device 100 and the head-mounted CGR device. Examples of control devices include the first remote device 106a, the second remote device 106b, and the third remote device 106c. The process 650 may utilize and incorporate devices and techniques described with respect to previous implementations, such as the devices and techniques described with respect to FIGS. 1-5.

Operation 651 includes receiving, at a host device, a received signal that identifies a control device. The control device may be one that has not previously connected to the host device. The received signal indicates a location for the control device, as discussed with respect to operation 352 of the process 350. The control device is connected to a controlled device. For example, the control device may be connected to the controlled device by electrical wiring to provide electrical power to the controlled device. As another example, the control device may be connected to the controlled device by a wireless or wired connection to send commands to the controlled device. The control device is configured to change an operating state of the controlled device, for example, between a first operating state (e.g., "on") and a second operating state (e.g., "off").

Operation 652 includes identifying visible devices in images of a location, which can be performed in the manner described with respect to operation 355 of the process 350.

Operation 653 includes matching the control device to a first visible device from the visible devices in the images based on presence of the first visible device within a search area of the images. Matching can be performed in the manner described with respect to operation 356 of the process 350. The search area of the images is determined based on the location for the control device as described with respect to the search area 548. Other filtering and matching techniques can be used as described in the process 350. As one example, a first visible device may be matched with the control device further based on a device type for the control device. As another example, a first visible device may be matched with the control device further based on a machine recognizable indicator that is output by the control device.

Operation 654 includes matching the controlled device to a second visible device from the visible devices in the images. As one example, the second visible device may be matched with the controlled device based on a user input that identifies the controlled device. The user input may be a selection made using a graphical user interface or a touch interface. The user input may be a verbal command. The verbal command may indicate the intended object by referring to it by a device type identifier ("ceiling light"). The user input may include a gaze angle of a device, such as the handheld CGR device 100 or the head-mounted CGR device, where the controlled device is selected by proximity of controlled device to the gaze angle.

In one implementation, the second visible device is matched with the controlled device by changing the operating state of the controlled device using the control device and detecting the change of the operating state of the second visible device in the images. For example, when pairing the control device, which in this example is a switch, the host device may direct the user to manually cycle the switch between on and off states or the host device may control cycling between on and off states. During cycling between on and off states, the host device obtains images, and detects the changed operating state in the images to match the controlled device to the control device.

Operation 655 includes pairing the control device with the host device. Pairing may be performed as described for operation 358. Additionally, information can be stored that associates the control device with the controlled device. This information can be used to allow a command directed to the controlled device ("turn on the lights") to be routed to the control device. This information can also be used to show, to a user through a display device, an association between the control device and the controlled device, such as a graphical indicator that links the two devices.

Operation 656 includes controlling the control device using the host device to change the operating state of the controlled device between a first operating state and a second operating state. Operation 656 may be performed in the manner described with respect to operation 359.

Figure 7:
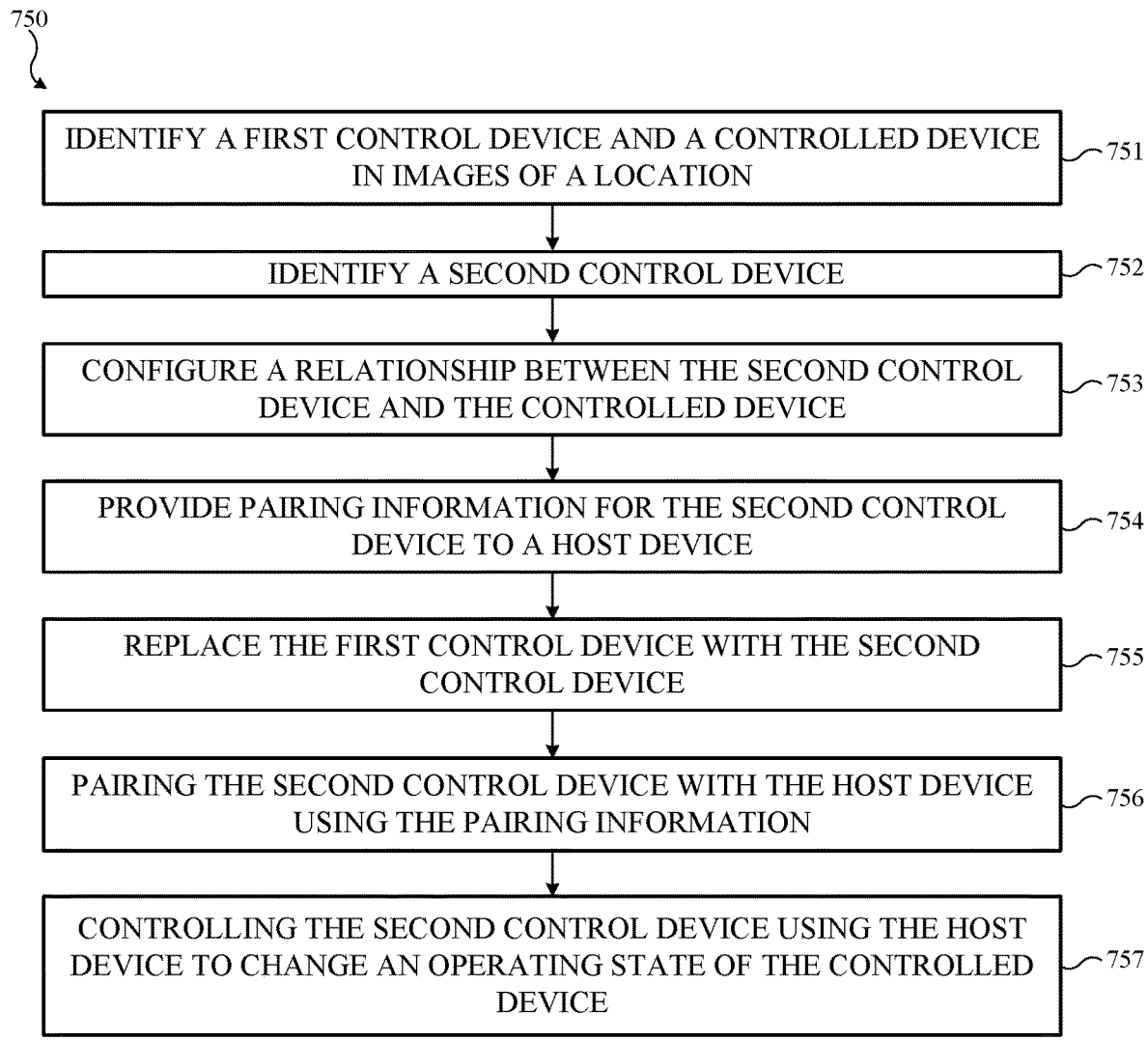
FIG. 7 is a flowchart that shows a process for device discovery and pairing according to a third example.

FIG. 7 is a flowchart that shows a process 750 for device discovery and pairing according to a third example. The process 750 may be performed, for example, using the handheld CGR device 100 or the head-mounted CGR device. Portions of the process 750 can be implemented as computer program instructions, such as the discovery and pairing software 240. The computer program instructions can be executed by a computing device, such as the processor 215 of the handheld CGR device 100. When executed, the instructions cause the computing device to perform the operations described herein. In some implementations, the process 750 is implemented in the form of computer executable program instructions on a non-transitory computer-readable storage device.

The process 750 allows a host device to connect to a control device that is connected to a controlled device and defines an association between the control device and the controlled device, such that the host device can operate the controlled device by sending commands to the control device in response to user commands that select the controlled device as a target. An example of a control device is a smart light switch and an example of a controlled device is a light (e.g., a wall or ceiling mounted light is a building), which may be connected to the control device by electrical wiring, or otherwise connected such that the control device is connected to the controlled device to change its operating state between a first operating state (e.g., the light is off) and a second operating state (e.g., the light is on). Examples of host devices include the handheld CGR device 100 and the head-mounted CGR device. Examples of control devices include the first remote device 106a, the second remote device 106b, and the third remote device 106c. The process 750 may utilize and incorporate devices and techniques described with respect to previous implementations, such as the devices and techniques described with respect to FIGS. 1-5.

Operation 751 includes identifying a first control device and a controlled device in images of a location. The images of the location can be obtained using an imaging device that is associated with a host device, as previously described with respect to the handheld CGR device 100 and the head-mounted CGR device. The devices can be identified in the images using machine vision techniques as described in operation 355 of the process 350.

The first control device is configured to change an operating state of the controlled device. The first control device may be, as examples, a conventional switch or a smart switch, and the controlled device may be any conventional or smart switch-operated component (e.g., a light).

Operation 752 includes identifying a second control device. The second control device is a smart control device that can be connected to and controlled by a host device, such as the handheld CGR device 100 or the head-mounted CGR device. The second control device is a device that is compatible with the function being performed by the first control device. Identifying the second control device is performed by accessing information that describes compatibility of the second control device with the application for which the first control device is being used. For example, the second control device can be identified by searching an e-commerce database and selecting an appropriate device that can be used as a replacement for the first control device.

Operation 753 includes configuring a relationship between the second control device and the controlled device. The relationship may be configured while the second control device is not co-located with the host device, such as at a time of purchasing and ordering the second control device, such as through an e-commerce system. Configuring the relationship between the second control device and the controlled device may include providing information to the second control device that describes a device type of the controlled device and operating states of the controlled device.

Operation 754 includes providing pairing information for the second control device to the host device. For example, the pairing information can be transmitted from an e-commerce platform to the host device.

After the relationship between the second control device and the host device is configured and the second control device is delivered to the physical location of the first control device and the host device, the second control device is installed for use with the controlled device by replacing the first control device with the second control device in operation 755 such that the second control device is configured to change the operating state of the controlled device.

Operation 756 includes pairing the second control device with the host device using the pairing information, which is performed as previously described except that the pairing information was previously provided to the host device in operation 754. Operation 757 includes controlling the second control device using the host device to change the operating state of the controlled device, for example, between a first operating state and a second operating state. In some implementations, the first control device is a first switch (e.g., a conventional switch or a smart switch), the second control device is a second switch (e.g., a smart switch), and the controlled device is a light.

Figure 8:
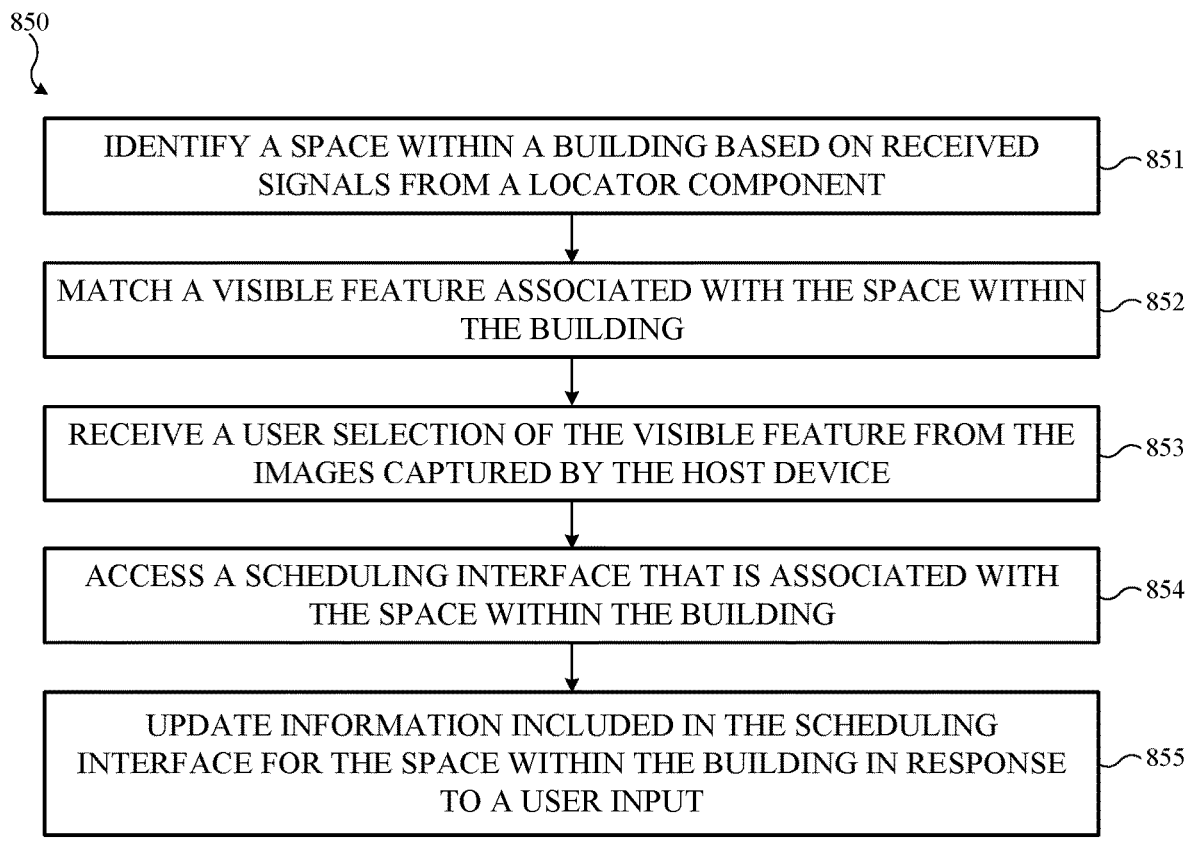
FIG. 8 is a flowchart that shows a process for room scheduling according to an example.

FIG. 8 is a flowchart that shows a process 850 for room scheduling according to an example. The process 850 may be performed, for example, using the handheld CGR device 100 or the head-mounted CGR device. Portions of the process 850 can be implemented as computer program instructions, such as the discovery and pairing software 240. The computer program instructions can be executed by a computing device, such as the processor 215 of the handheld CGR device 100. When executed, the instructions cause the computing device to perform the operations described herein. In some implementations, the process 850 is implemented in the form of computer executable program instructions on a non-transitory computer-readable storage device.

The process 850 allows a host device to identify a room in a building (e.g., a conference room) and access scheduling information and/or change scheduling information. Location information broadcast by remote devices that are associated with respective rooms are used to help the host device identify specific rooms in order to access data regarding them. The process 850 can be extended beyond scheduling, to more generally allow disambiguate similar physical places or objects and access and modify information about them. The process 850 may utilize locating, identifying, and matching techniques as in previously described implementations, such as the process 350.

Operation 851 includes identifying, by a host device, a space within a building based on received signals from a locator component that is associated with the space within the building. The locator component is operable to transmit location signals as described with respect to the wireless position sensing system 214 and the signals 107a-107c sent by the first through third remote devices 106a-106c.

Operation 852 includes matching a visible feature associated with the space within the building with the received signals from the locator component. Matching a visible feature can be performed in the same manner as image-based matching as discussed previously, for example, with respect to operation 356 of the process 350. The received signals may identify the visible feature, such as by describing a type of feature or by information that allows images of similar or the actual feature to be accessed for comparison purposes.

Operation 853 includes receiving a user selection of the visible feature from the images captured by the host device. As examples, a user input can be made with a graphical user interface, a touch interface, or by a verbal command spoken by the user that identifies the visible feature. I response to user selection of the visible feature, operation 854 includes accessing a scheduling interface that is associated with the space within the building. The scheduling interface may include, for example, a calendar view that shows whether the space is available for use. The scheduling interface may allow the user to reserve the physical space by adding an item to the calendar (or other scheduling interface) indicating that the space is in use.

Operation 855 includes updating information included in the scheduling interface for the space within the building in response to a user input. For example, a user may access the scheduling interface for the room and schedule a meeting at the room such that the room is indicated as in use and no longer available for use by others during a specified time period.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify devices that are available for use and configuration connections to those devices. Accordingly, use of such personal information data enables users to seamlessly connect to and control a variety of devices. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of connecting to and configuring devices for use, the present technology can be configured to allow users to select to "opt in" or "opt out" of participation in the collection of personal information data during registration for services or anytime thereafter. In another example, users can select not to provide personal data for use in connecting to and configuring devices. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, devices to be connected to and configuration of those devices can be performed based on non-personal information data or a bare minimum amount of personal information, such as the content being requested by the device associated with a user, other non-personal information available to the devices, or publicly available information.

What is claimed is:

1. A method, comprising:
identifying, by a host device, a first remote device based on received signals, wherein the received signals include a location signal that indicates a location of the first remote device relative to the host device and a device type for the first remote device;
obtaining an image of an environment around the host device;
analyzing the image of the environment to identify visible devices that can be seen in the image of the environment using an object detection model that is configured to detect the presence and device types of the visible devices in the image of the environment;
identifying a portion of the image as a search area of the image based on the location signal from the first remote device; and
matching a first visible device from the visible devices to the first remote device based on presence of the first visible device within the search area of the image, based further on comparison of the device type for the first remote device to a device type for the first visible device, and based further on a machine recognizable indicator that is output by the first visible device.

2. The method of claim 1, further comprising:
pairing the first remote device with the host device is performed in response to a user input from a user; and
controlling a function of the first remote device using the host device subsequent to pairing the first remote device with the host device.

3. The method of claim 2, wherein the user input indicates an intention to pair the host device with the first remote device by including a device type indication that corresponds to the device type of the first remote device.

4. The method of claim 2, wherein the images of the environment around the host device are captured using an imaging device that is associated with the host device and the user input indicates an intention to pair the host device with the first remote device based on a view angle of the imaging device.

5. The method of claim 2, wherein the user input includes a verbal command that is spoken by the user.

6. The method of claim 1, wherein matching the first visible device to the first remote device includes excluding a second remote device as a potential match to the first visible device based on a difference between a location of the first visible device and a location of the second remote device.

7. The method of claim 1, wherein the machine recognizable indicator includes content that is output for display on a screen of the first remote device and the host device analyzes the content to match the first visible device to the first remote device further based on the machine recognizable indicator.

8. The method of claim 7, wherein the content is predetermined content.

9. The method of claim 7, wherein the first remote device transmits a screenshot showing the content to the host device and the host device compares the screenshot to the image of the environment to match the first visible device to the first remote device further based on the machine recognizable indicator.

10. The method of claim 1, wherein the machine recognizable indicator includes visible illumination.

11. The method of claim 1, wherein the machine recognizable indicator includes infrared illumination.

12. A non-transitory computer-readable storage device including program instructions executable by one or more processors that, when executed, cause the one or more processors to perform operations, the operations comprising:
identifying, by a host device, a first remote device based on received signals, wherein the received signals include a location signal that indicates a location of the first remote device relative to the host device and a device type for the first remote device;
obtaining an image of an environment around the host device;
analyzing the image of the environment to identify visible devices that can be seen in the image of the environment using an object detection model that is configured to detect the presence and device types of the visible devices in the image of the environment;
identifying a portion of the image as a search area of the image based on the location signal from the first remote device; and
matching a first visible device from the visible devices to the first remote device based on presence of the first visible device within the search area of the image, based further on comparison of the device type for the first remote device to a device type for the first visible device, and based further on a machine recognizable indicator that is output by the first visible device.

13. The non-transitory computer-readable storage device of claim 12, further comprising:
pairing the first remote device with the host device is performed in response to a user input from a user; and
controlling a function of the first remote device using the host device subsequent to pairing the first remote device with the host device.

14. The non-transitory computer-readable storage device of claim 13, wherein the images of the environment around the host device are captured using an imaging device that is associated with the host device and the user input indicates an intention to pair the host device with the first remote device based on a view angle of the imaging device.

15. The non-transitory computer-readable storage device of claim 12, wherein matching the first visible device to the first remote device includes excluding a second remote device as a potential match to the first visible device based on a difference between a location of the first visible device and a location of the second remote device.

16. The non-transitory computer-readable storage device of claim 12, wherein the machine recognizable indicator includes content that is output for display on a screen of the first remote device and the host device analyzes the content to match the first visible device to the first remote device further based on the machine recognizable indicator.

17. A system, comprising:
a memory; and
one or more processors that are configured to execute instructions that are stored in the memory, wherein the instructions, when executed, cause the one or more processors to:
identify a first remote device based on received signals, wherein the received signals include a location signal that indicates a location of the first remote device relative to a host device and a device type for the first remote device;
obtain an image of an environment around the host device;
analyze the image of the environment to identify visible devices that can be seen in the image of the environment using an object detection model that is configured to detect the presence and device types of the visible devices in the image of the environment;

identify a portion of the image as a search area of the image based on the location signal from the first remote device; and match a first visible device from the visible devices to the first remote device based on presence of the first visible device within the search area of the image, based further on comparison of the device type for the first remote device to a device type for the first visible device, and based further on a machine recognizable indicator that is output by the first visible device.

18. The system of claim 17, wherein the instructions further cause the one or more processors to:

pair the first remote device with the host device is performed in response to a user input from a user; and control a function of the first remote device using the host device subsequent to pairing the first remote device with the host device.

19. The system of claim 18, wherein the images of the environment around the host device are captured using an imaging device that is associated with the host device and the user input indicates an intention to pair the host device with the first remote device based on a view angle of the imaging device.

20. The system of claim 17, wherein instructions to match the first visible device to the first remote device include instructions to exclude a second remote device as a potential match to the first visible device based on a difference between a location of the first visible device and a location of the second remote device.

21. The system of claim 17, wherein the machine recognizable indicator includes content that is output for display on a screen of the first remote device and the host device analyzes the content to match the first visible device to the first remote device further based on the machine recognizable indicator.

* * * * *